(12) United States Patent
Matsumoto et al.

(10) Patent No.: US 11,795,834 B2
(45) Date of Patent: Oct. 24, 2023

(54) AIRCRAFT PROPULSION SYSTEM

(71) Applicant: HONDA MOTOR CO., LTD., Tokyo (JP)

(72) Inventors: Takeshi Matsumoto, Wako (JP); Akinori Kita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/683,388

(22) Filed: Mar. 1, 2022

(65) Prior Publication Data
US 2022/0290606 A1 Sep. 15, 2022

(30) Foreign Application Priority Data

Mar. 9, 2021 (JP) ................. 2021-036961

(51) Int. Cl.
| | | |
|---|---|---|
| F01D 15/10 | (2006.01) |
| H02P 9/10 | (2006.01) |
| H02P 9/04 | (2006.01) |
| F02C 9/48 | (2006.01) |
| F02C 6/20 | (2006.01) |

(Continued)

(52) U.S. Cl.
CPC ............... *F01D 15/10* (2013.01); *F02C 9/48* (2013.01); *H02P 9/04* (2013.01); *H02P 9/107* (2013.01); *B64D 2027/026* (2013.01); *F02C 6/20* (2013.01); *F02C 7/36* (2013.01); *F04D 27/02* (2013.01); *F05D 2220/323* (2013.01); *F05D 2220/76* (2013.01); *F05D 2270/021* (2013.01); *F05D 2270/022* (2013.01); *F05D 2270/042* (2013.01); *F05D 2270/052* (2013.01); *F05D 2270/304* (2013.01); *F05D 2270/309* (2013.01);

(Continued)

(58) Field of Classification Search
CPC .... F01D 15/10; F02C 9/48; F02C 6/20; F02C 7/36; H02P 9/04; H02P 9/107; H02P 9/102; H02P 9/105; B64D 2027/026; F04D 27/02; F05D 2220/323; F05D 2220/76; F05D 2270/021; F05D 2270/022; F05D 2270/042; F05D 2270/052; F05D 2270/304; F05D 2270/309; F05D 2270/335
See application file for complete search history.

(56) References Cited

U.S. PATENT DOCUMENTS 5,635,768 A * 6/1997 Birch ................. H02P 9/48
290/40 C
7,615,881 B2 * 11/2009 Halsey ............... F01D 15/10
60/773

(Continued)

*Primary Examiner* — Gerald L Sung
*Assistant Examiner* — Rene D Ford
(74) *Attorney, Agent, or Firm* — AMIN, TUROCY & WATSON, LLP

(57) ABSTRACT

An aircraft propulsion system includes a gas turbine engine; a generator; a storage battery; a motor which drives a rotor, using at least one of the electric power which is output from the generator and the electric power which is output from the storage battery; a detection unit which detects the number of revolutions of the engine shaft; an engine control unit which controls at least a fuel flow rate of the gas turbine engine; and a generator control unit which controls the operation of the generator. When the number of revolutions satisfies a predetermined condition, at least the generator control unit executes a control for reducing a sudden change in the number of revolutions.

7 Claims, 10 Drawing Sheets

(51) Int. Cl.
*F02C 7/36* (2006.01)
*B64D 27/02* (2006.01)
*F04D 27/02* (2006.01)

(52) U.S. Cl.
CPC ........ *F05D 2270/335* (2013.01); *H02P 9/102* (2013.01); *H02P 9/105* (2013.01)

(56) References Cited

U.S. PATENT DOCUMENTS

| | | |
|---|---|---|
| 8,727,271 B2 | 5/2014 | Salyer |
| 2014/0245748 A1* | 9/2014 | Anghel .................... F02C 9/00 60/793 |
| 2021/0171212 A1* | 6/2021 | Keller .................... B64D 31/06 |

* cited by examiner

AIRCRAFT PROPULSION SYSTEM

CROSS-REFERENCE TO RELATED APPLICATION

Priority is claimed on Japanese Patent Application No. 2021-036961 filed Mar. 9, 2021, the content of which is incorporated herein by reference.

BACKGROUND OF THE INVENTION

Field of the Invention

The present invention relates to an aircraft propulsion system.

Description of Related Art

A hybrid propulsion system equipped with a gas turbine engine, a generator, and a storage battery is known. One such hybrid propulsion system is an aircraft propulsion system (Patent Document 1 (U.S. Pat. No. 8,727,271)). Further, in the control of the gas turbine engine, a range of operating points (hereinafter referred to as "operating range") defined depending on the rotational speed and a torque of an engine shaft is determined in advance. When there is an operating point inside the operating range, the gas turbine engine operates normally. In contrast, when the operating point is outside the operating range, in some cases, surging, engine stall, abnormally high temperature, misfire, and the like may occur in the gas turbine engine. Therefore, the aircraft propulsion system controls the rotational speed and the torque of the engine shaft so that the operating point is always present within a predetermined operating range.

However, there is a case in which a sudden change in airflow or a breakdown of the rotor may cause a sudden load loss or an overload on the engine shaft. When a load loss suddenly occurs in the engine shaft, there may be a case in which the rotational speed of the engine shaft suddenly increases, and damage to and misfiring of the gas turbine engine may occur.

To prevent damage to and misfiring of the gas turbine engine, the aircraft propulsion system reduces the fuel flow rate of the gas turbine engine to reduce the rotational speed and the torque of the engine shaft. Further, when an overload occurs suddenly on the engine shaft, there may be a case in which the rotational speed of the engine shaft suddenly drops, and surging and engine stalling may occur. To prevent surging and engine stalling, the aircraft propulsion system increases the fuel flow rate of the gas turbine engine to increase the rotational speed and the torque of the engine shaft.

However, the response of the rotational speed and the torque of the engine shaft is slow with respect to the control of the fuel flow rate of the gas turbine engine. For this reason, unless the aircraft propulsion system controls the fuel flow rate promptly, in some cases, the gas turbine engine may not be able to be protected. In this way, in some cases, it is not possible to protect the gas turbine engine against a sudden load loss or overload on the engine shaft.

The present invention has been made in consideration of such circumstances, and one of the objects of the present invention is to protect a gas turbine engine against a sudden load loss or overload on the engine shaft.

SUMMARY OF THE INVENTION

The aircraft propulsion system according to the present invention has the following configuration.

(1): An aircraft propulsion system according to an aspect of the present invention includes a gas turbine engine mounted on an aircraft; a generator which is coupled to an engine shaft of the gas turbine engine and generates electricity using rotation of the engine shaft; a storage battery which stores electric power generated by the generator; a motor which drives a rotor, using at least one of the electric power which is output from the generator and the electric power which is output from the storage battery; a detection unit which detects the rotational speed of the engine shaft; an engine controller which controls at least a fuel flow rate of the gas turbine engine; and a generator controller which controls the operation of the generator, in which when the rotational speed satisfies a predetermined condition, at least the generator controller executes control for curtailing sudden change in the rotational speed.

(2): In the aspect of above (1), the predetermined condition may be that regarding a first threshold value and a second threshold value determined according to an operating point determined based on the number of revolutions and a torque of the engine shaft, one of a first condition, in which the number of revolutions exceeds the first threshold value, and a second condition, in which the number of revolutions falls below the second threshold value smaller than the first threshold value, is satisfied. When the first condition is satisfied, the generator controller may increase an amount of power generation of the generator as compared with the amount of power generation of the generator before the first condition was satisfied, and when the second condition is satisfied, the generator controller may reduce the amount of power generation of the generator as compared with the amount of power generation of the generator before the second condition is satisfied.

(3): In the aspect of the above (2), when the first condition is satisfied, the engine controller may reduce the fuel flow rate depending on a rate of change in the number of revolutions.

(4): In the aspect of the above (3), when the first condition is satisfied, the generator controller may increase the amount of power generation of the generator to an upper limit value of the amount of power generation, and the engine controller may reduce the fuel flow rate to a lower limit value of the flow rate.

(5): In the aspect of the above (2), when the second condition is satisfied, the engine controller may increase the fuel flow rate depending on the rate of change in the number of revolutions.

(6): In the aspect of the above (5), when the second condition is satisfied, the generator controller may increase an amount of power running of the generator, and the engine controller may increase the fuel flow rate to an upper limit value of the flow rate.

(7): In the aspect of the above (2), when the second condition is satisfied and the number of revolutions does not reach a target value within a predetermined time, the generator controller may increase an amount of power running of the generator.

(8): In any one aspect of the above aspects (2) to (7), regarding a third threshold value and a fourth threshold value defined according to the operating point, when one of a third condition, in which the torque exceeds the third threshold value, and a fourth condition, in which the torque falls below the fourth threshold value smaller than the third threshold value, is satisfied, the generator controller may execute a control for reducing the sudden change in the torque.

(9): An aircraft propulsion system according to an aspect of the present invention includes a gas turbine engine mounted on an aircraft; a generator which is coupled to an engine shaft of the gas turbine engine and generates electricity using rotation of the engine shaft; a storage battery which stores an electric power generated by the generator; a motor which drives a rotor, using at least one of the electric power which is output from the generator and the electric power which is output from the storage battery; a detection unit which detects a torque of the engine shaft; an engine controller which controls at least a fuel flow rate of the gas turbine engine; and a generator controller which controls the operation of the generator, in which when the torque satisfies a predetermined condition, at least the generator controller executes a control for reducing a sudden change in the torque.

According to the aspects (1) to (2), when the number of revolutions satisfies a predetermined condition, at least the generator controller executes a control for reducing a sudden change in the number of revolutions. Accordingly, the aircraft propulsion system can protect the gas turbine engine against a sudden load loss or an overload on the engine shaft.

According to the aspect (3), the aircraft propulsion system can reduce the likelihood that the rotational speed of the engine shaft will exceed the upper limit value of the rotational speed due to a load loss.

According to the aspect (4), the aircraft propulsion system can further reduce the likelihood that the number of revolutions of the engine shaft exceeds the upper limit value of the number of revolutions due to the load loss.

According to the aspect (5), the aircraft propulsion system can reduce the likelihood that the number of revolutions of the engine shaft falls below the lower limit value of the number of revolutions due to an overload.

According to the aspects (6) to (7), the aircraft propulsion system can further reduce the likelihood that the number of revolutions of the engine shaft falls below the lower limit value of the number of revolutions due to the overload.

According to the aspect (8), when the torque satisfies a predetermined condition, at least the generator controller executes the control for reducing a sudden change in the torque. Accordingly, the aircraft propulsion system can protect the gas turbine engine.

According to the aspect (9), when the number of revolutions satisfies a predetermined condition, at least the generator controller executes the control for reducing the sudden change in the number of revolutions. Accordingly, the aircraft propulsion system can protect the gas turbine engine.

DETAILED DESCRIPTION OF THE INVENTION

Hereinafter, embodiments of an aircraft propulsion system of the present invention will be described with reference to the drawings.

SUMMARY

The aircraft propulsion system of the embodiment is a hybrid propulsion system which is equipped with a gas turbine engine, a generator, and a storage battery. The generator is coupled to an engine shaft of the gas turbine engine. The generator executes regenerative running by the use of rotation of the engine shaft. The generator may execute power running by the use of the power that is output from the storage battery. The aircraft propulsion system of the embodiment executes the operations exemplified in the following (1) and (2).

(1) When a Load Loss Occurs on the Engine Shaft

The aircraft propulsion system increases an amount of power generation (amount of regeneration) of the generator in proportion to a rate of change over time of at least one of the rotational speed and torque of the engine shaft. The aircraft propulsion system may reduce the fuel flow rate of the gas turbine engine. As a result, since the torque load on the engine shaft increases, over-rotation of the engine shaft is curtailed, and damage to the engine and misfiring are curtailed.

(2) When an Overload Occurs on the Engine Shaft

The aircraft propulsion system reduces the amount of power generation (amount of regeneration) of the generator to be proportional to the rate of time change of at least one of the number of revolutions and torque of the engine shaft. The aircraft propulsion system may increase the fuel flow rate of the gas turbine engine. As a result, since the torque load on the engine shaft is reduced, a sudden decrease in the rotation of the engine shaft is suppressed, and surging and engine stall are suppressed.

When the sudden decrease in the number of revolutions of the engine shaft continues for a predetermined time even if the amount of power generation decreases, the aircraft propulsion system operates the generator as a motor (power running) by the use of the electric power that is output from the storage battery. As a result, since a reverse torque occurs on the engine shaft, a sudden decrease in the rotation of the engine shaft is further suppressed, and surging and engine stall are further suppressed.

In the above (1) and (2), when the load amount and the amount of power generation temporarily do not match, the aircraft propulsion system compensates for the difference between the load amount and the amount of power generation by charging or discharging in the storage battery.

Embodiment

Figure 1:
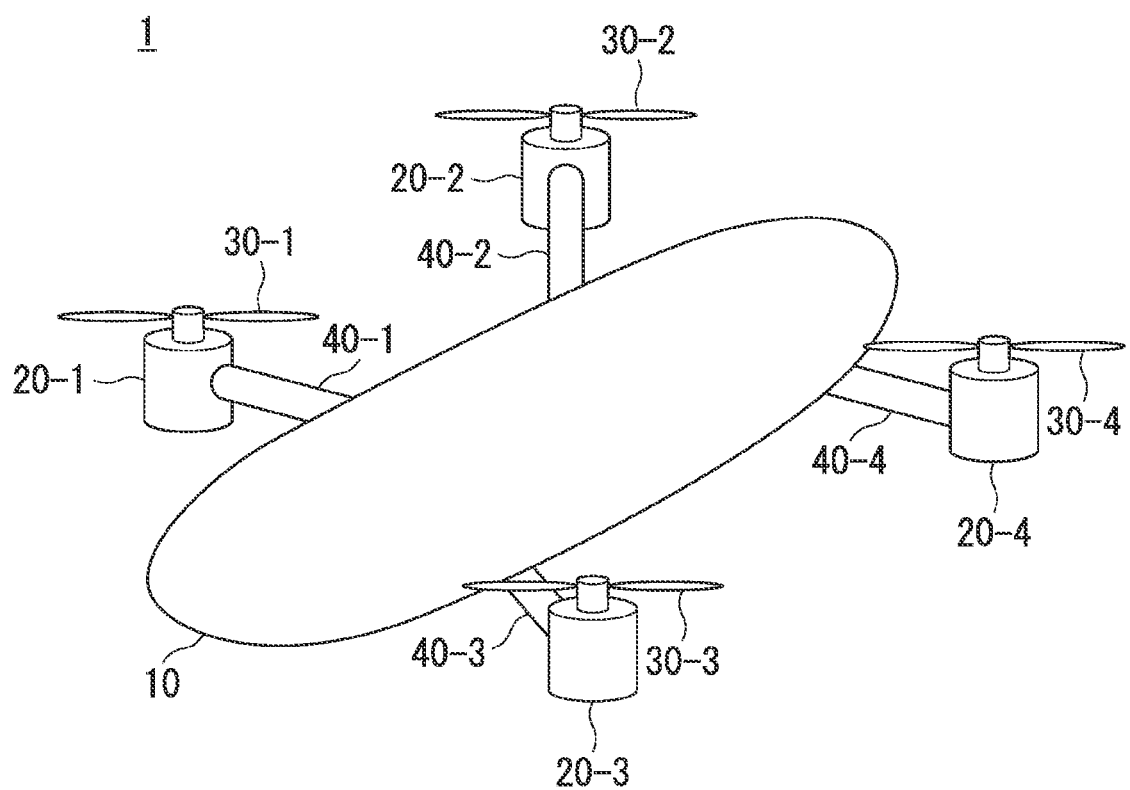
FIG. 1 is a diagram schematically showing an example of an aircraft configuration.

FIG. 1 is a diagram schematically showing a configuration example of the aircraft 1. The aircraft 1 is equipped with an airframe 10, a motor 20-n (n is an integer from 1 to N), an arm 40-n, and a rotor 30-n. The aircraft 1 is not limited to any particular type of aircraft. The aircraft 1 is, for example, a multicopter, a helicopter, or a compound aircraft having both rotors and fixed blades. The aircraft 1 may be a manned aircraft or may be an unmanned aircraft.

The rotor 30-n is attached to the airframe 10 via the arm 40-n. A motor 20-n is attached to the rotary shaft of the rotor 30-n. The motor 20-n drives the rotor 30-n by the use of an electric current. The motor 20 is, for example, a brushless DC motor. The rotor 30-n includes a blade. The rotor 30-n rotates about a vertical axis when an attitude of the aircraft 1 is horizontal.

Hereinafter, regarding matters common to the motors 20-n, a part of the reference signs may be omitted, and the "motors 20-n" may be described as "motors 20". Regarding the matters common to the arms 40-n, a part of the reference numerals is omitted, and the "arm 40-n" is described as an "arm 40". Regarding the matters common to the rotors 30-n, a part of the reference numerals is omitted, and the "rotor 30-n" is described as a "rotor 30".

The amount of current of the motor 20-n is controlled depending on a control signal. The rotor 30 rotates when the motor 20-n drives the rotor 30-n depending on the amount of current. As a result, the aircraft 1 obtains lift. The control signal is generated based on the operation of an operator of the aircraft 1 or an instruction provided by an autopilot. For example, when the rotor 30-1 and the rotor 30-4 rotate in a first direction (for example, a clockwise direction), and the rotor 30-2 and the rotor 30-3 rotate in a second direction (for example, a counterclockwise direction), the aircraft 1 flies. In addition to the rotor 30, the airframe 10 may include an auxiliary rotor (not shown) for posture retaining or for horizontal propulsion.

Figure 2:
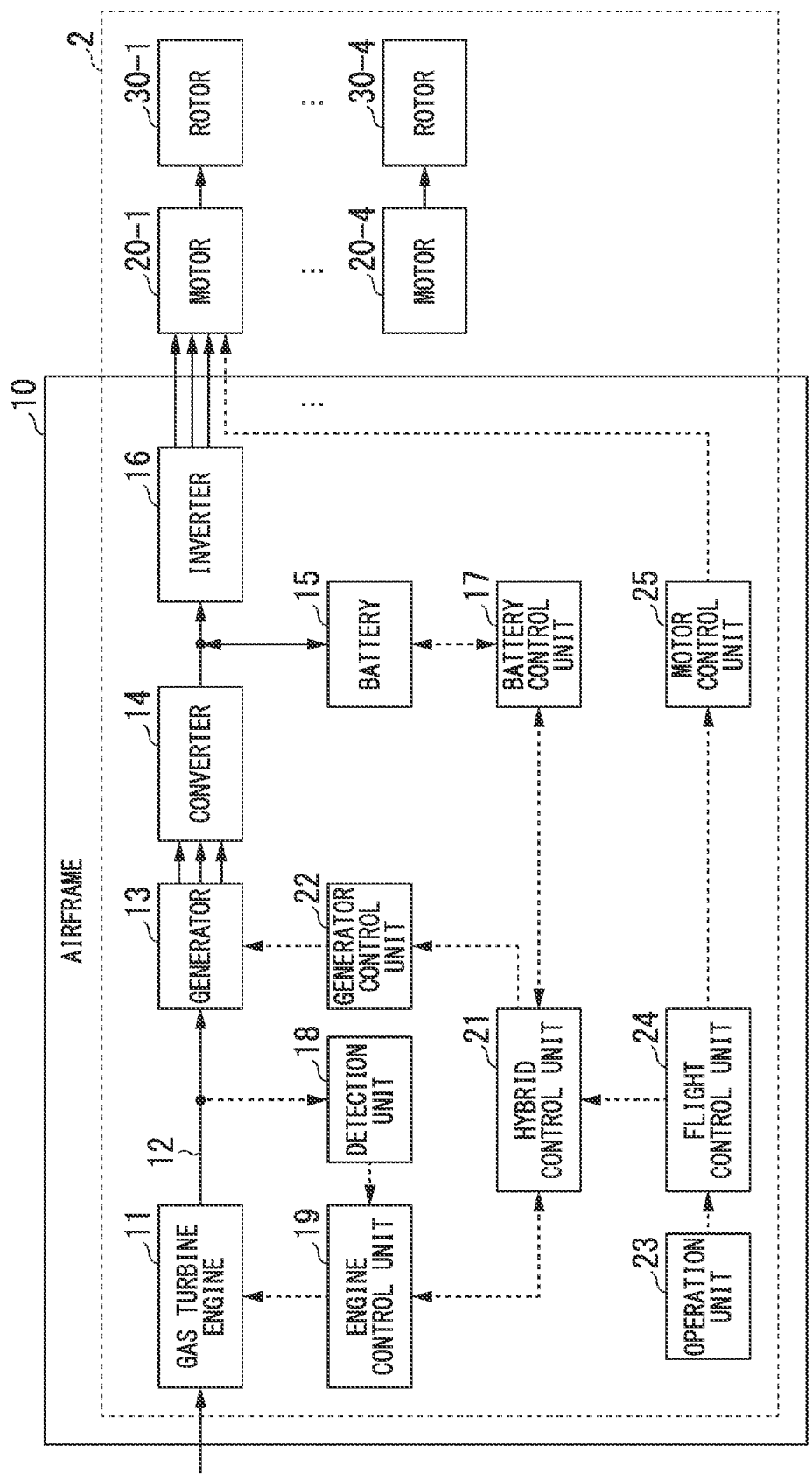
FIG. 2 is a diagram showing a configuration example of an aircraft propulsion system.

FIG. 2 is a diagram showing a configuration example of the aircraft propulsion system 2. The aircraft propulsion system 2 includes a gas turbine engine 11, an engine shaft 12, a generator 13, a converter 14, a storage battery 15, an inverter 16, a storage battery control unit 17, a detection unit 18, an engine control unit (an engine controller) 19, a motor 20-n, a hybrid control unit 21, a generator control unit (a generator controller) 22, an operation unit 23, a flight control unit 24, a motor control unit 25, and a rotor 30-n. The airframe 10 includes a motor 20-n and a rotor 30-n among them outside the airframe 10. The generator 13 is coupled to the engine shaft 12 of the gas turbine engine 11 in advance.

The constituent elements of the storage battery control unit 17, the engine control unit 19, the hybrid control unit 21, the generator control unit 22, the flight control unit 24, and the motor control unit 25 are, for example, realized by executing a program (software) using a hardware processor such as a central processing unit (CPU). Some or all of these constituent elements may be realized by hardware (a circuit unit; including circuitry) such as a large scale integration (LSI), an application specific integrated circuit (ASIC), a field-programmable gate array (FPGA), and a graphics processing unit (GPU), or may be realized by cooperation of software and hardware. The program may be stored in advance in a storage device (a storage device including a non-transient storage medium) such as a hard disk drive (HDD) or a flash memory, or may be stored in a detachable storage medium (non-transient storage medium) such as a DVD or a CD-ROM, and may be installed by mounting the storage medium in a drive device.

The gas turbine engine 11 rotationally drives the engine shaft 12 depending on the fuel flow rate controlled by the engine control unit 19. The generator 13 executes regenerative running or power running depending on the control of the generator control unit 22. When the regenerative running is executed, the generator 13 generates electricity by utilizing the rotation of the engine shaft 12. When the generator 13 is used as a motor, the generator 13 performs power running, using the electric power that is output from the storage battery 15 via the converter 14.

The converter 14 converts the three-phase alternating current (electric power) that is output from the generator 13 into a direct current, when the generator 13 executes the regenerative running. The converter 14 outputs the converted direct current to the inverter 16. The converter 14 may output the converted direct current to the storage battery 15. As a result, the converted direct current is stored in the storage battery 15.

The converter 14 converts the direct current which is output from the storage battery 15 into a three-phase alternating current (electric power), when the generator 13 executes the power running. The converter 14 outputs the converted three-phase alternating current to the generator 13. As a result, the generator 13 executes power running, using the converted three-phase alternating current.

The storage battery 15 stores the direct current (electric power) which is output from the generator 13, depending on the control of the storage battery control unit 17. The storage battery 15 outputs the stored electric power to the converter 14 or the inverter 16 depending on the control of the storage battery control unit 17.

The inverter 16 converts the direct current which is output from the converter 14 into a three-phase alternating current. The inverter 16 outputs a three-phase alternating current to the motor 20. The motor 20-n rotationally drives the rotor 30-n, by utilizing the three-phase alternating current that is output from the inverter 16.

The storage battery control unit 17 controls the power storage operation and the power discharge operation of the storage battery 15. The storage battery control unit 17 outputs the power storage amount data in the storage battery 15 to the hybrid control unit 21. The storage battery control unit 17 switches an operating mode of the storage battery 15 into the power storage mode or the power discharge mode depending on the control of the hybrid control unit 21.

The detection unit 18 detects the number of revolutions of the engine shaft 12 using, for example, a resolver. The detection unit 18 detects the torque of the engine shaft 12 using, for example, a strain gauge. The detection unit 18 may detect the torque of the engine shaft 12 using, for example, a polarized light of an optical material stuck to the surface of the engine shaft 12. The detection unit 18 outputs the data of number of revolutions and the torque data of the engine shaft 12 to the engine control unit 19.

The engine control unit 19 controls the fuel flow rate of the gas turbine engine 11 based on the control command generated by the hybrid control unit 21. The control command represents, for example, a command value of the number of revolutions of the engine shaft 12 and a command value of the torque of the engine shaft 12.

The hybrid control unit 21 acquires the data of number of revolutions of the engine shaft 12 from the detection unit 18 via the engine control unit 19. The hybrid control unit 21 acquires the torque data of the engine shaft 12 from the detection unit 18 via the engine control unit 19. The hybrid control unit 21 acquires a signal representing a target value of the number of revolutions of the rotor 30 from the flight control unit 24. The hybrid control unit 21 acquires the power storage amount data in the storage battery 15 from the storage battery control unit 17. The hybrid control unit 21 generates a control command with respect to at least one of the generator control unit 22 and the engine control unit 19, based on the data of number of revolutions and torque data of the engine shaft 12 and the signal representing the target value of the number of revolutions of the rotor 30.

The generator control unit 22 controls the operation of the generator 13 based on the control command generated by the hybrid control unit 21. The generator control unit 22 causes the generator 13 to execute the regenerative running based on the control command. The generator control unit 22 may cause the generator 13 to perform the power running based on the control command.

When the number of revolutions of the engine shaft 12 satisfies a first predetermined condition, the generator control unit 22 executes control for reducing a sudden change in the number of revolutions of the engine shaft 12. The predetermined first condition is a condition that either a first condition or a second condition is satisfied with respect to the predetermined first threshold value and a predetermined second threshold value.

Hereinafter, the first threshold value is expressed as a first upper limit threshold value "A1". The second threshold value is expressed as a first lower limit threshold value "B1" or a second lower limit threshold value "B2". The first upper limit threshold value "A1", the first lower limit threshold value "B1", and the second lower limit threshold value "B2" are determined depending on the operating points determined based on the number of revolutions of the engine shaft 12 and the torque of the engine shaft 12. Among the first upper limit threshold value "A1", the first lower limit threshold value "B1", and the second lower limit threshold value "B2", the first upper limit threshold value "A1" is the largest value, and the second lower limit threshold value "B2" is the smallest value. Details of the first upper limit threshold value "A1", the first lower limit threshold value "B1", and the second lower limit threshold value "B2" will be described later using FIG. 4.

The first condition is a condition that the number of revolutions of the engine shaft 12 exceeds the first upper limit threshold value "A1". The second condition is a condition that the number of revolutions of the engine shaft 12 falls below the first lower limit threshold value "B1". The second condition may be a condition that the number of revolutions of the engine shaft 12 falls below the second lower limit threshold value "B2".

When the first condition is satisfied, the generator control unit 22 increases the amount of power generation of the generator 13 as compared with the amount of power generation of the generator 13 before the first condition is satisfied. When the second condition is satisfied, the generator control unit 22 reduces the amount of power generation of the generator 13 as compared with the amount of power generation of the generator 13 before the second condition is satisfied. When the second condition is satisfied and the torque does not reach the target value within a predetermined time, the generator control unit 22 may increase the amount of power running of the generator 13.

When the torque of the engine shaft 12 satisfies the second predetermined condition, the generator control unit 22 executes a control for reducing a sudden change in the torque of the engine shaft 12. The second predetermined condition is a condition that either a third condition or a fourth condition is satisfied with respect to a predetermined third threshold value and a predetermined fourth threshold value.

Hereinafter, the third threshold value is expressed as the second upper limit threshold value "A2". The fourth threshold value is expressed as a third lower limit threshold value "B3" or a fourth lower limit threshold value "B4". The second upper limit threshold value "A2", the third lower limit threshold value "B3", and the fourth lower limit threshold value "B4" are determined depending on the operating points that are determined based on the number of revolutions of the engine shaft 12 and the torque of the engine shaft 12. Among the second upper limit threshold value "A2", the third lower limit threshold value "B3", and the fourth lower limit threshold value "B4", the second upper limit threshold value "A2" is the largest value, and the fourth lower limit threshold value "B4" is the smallest value. Details of the second upper limit threshold value "A2", the third lower limit threshold value "B3", and the fourth lower limit threshold value "B4" will be described later using FIG. 5.

The third condition is a condition that the torque of the engine shaft 12 exceeds the second upper limit threshold value "A2". The fourth condition is a condition that the torque of the engine shaft 12 falls below the third lower limit threshold value "B3". The fourth condition may be a condition that the number of revolutions of the engine shaft 12 falls below the fourth lower limit threshold value "B4".

When the third condition is satisfied, the generator control unit 22 increases the amount of power generation of the generator 13 as compared with the amount of power generation of the generator 13 before the third condition is satisfied. When the fourth condition is satisfied, the generator control unit 22 reduces the amount of power generation of the generator 13 as compared with the amount of power generation of the generator 13 before the fourth condition is satisfied. When the fourth condition is satisfied and the torque does not reach the target value within a predetermined time, the generator control unit 22 may increase the amount of power running (electric amount) of the generator 13.

The operation unit 23 includes, for example, a control stick, operation buttons, and a touch panel. The operation unit 23 may include a display device such as a liquid crystal display. The operation unit 23 accepts the operations of the operator. The operation unit 23 outputs a route data of the aircraft 1, a speed data of the aircraft 1, and an altitude data of the aircraft 1 to the flight control unit 24 depending on the operation of the operator. The operation unit 23 may output the speed data of the aircraft 1 and the altitude data of the aircraft 1 to the flight control unit 24 depending on the detection result provided by a sensor (not shown).

The flight control unit 24 generates a signal representing a target value of the number of revolutions (rotational speed) of the rotor 30 based on the speed data of the aircraft 1. The flight control unit 24 outputs a signal representing a target value of the number of revolutions of the rotor 30 to the hybrid control unit 21 and the motor control unit 25. The motor control unit 25 controls the amount of current in the motor 20 based on the signal representing a target value of the number of revolutions of the rotor 30. The rotor 30 rotates at a number of revolutions corresponding to the amount of current in the motor 20. As a result, the lift of the aircraft 1 is obtained.

Next, a control based on the number of revolutions of the engine shaft 12 will be described.

Figure 3:
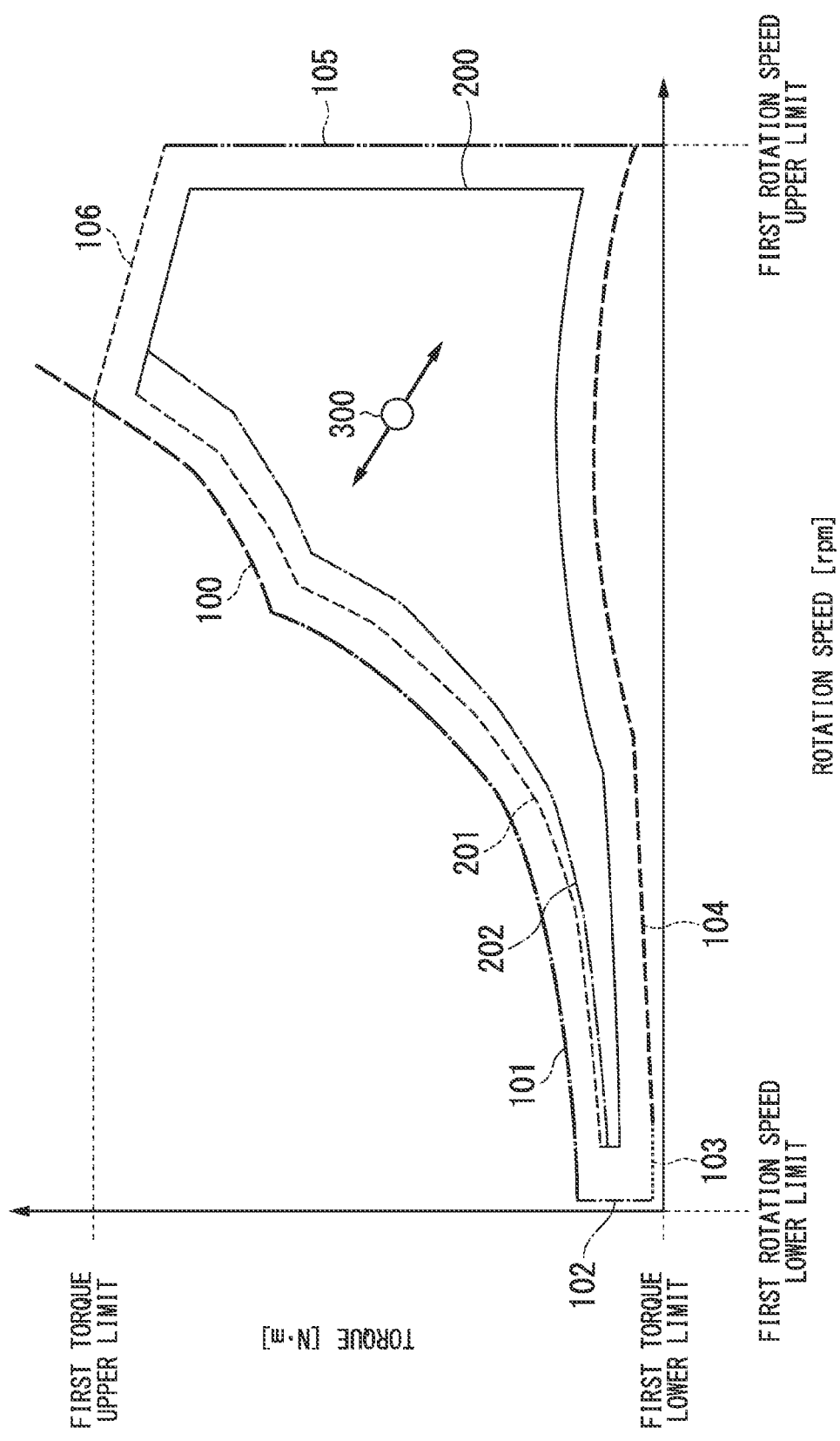
FIG. 3 is a diagram showing an example of each threshold value line for the number of revolutions.

FIG. 3 is a diagram showing an example of each threshold value line with respect to the number of revolutions. A horizontal axis shows the number of revolutions of the engine shaft 12. A vertical axis shows the torque of the engine shaft 12. A position of the operating point 300 is determined depending on the number of revolutions and torque of the engine shaft 12. In the control of the gas turbine engine 11, the range (operating range) of the operating point 300 is predetermined. The operating range is a single closed region (range) which is surrounded by a first boundary line 100, a second boundary line 101, a third boundary line 102, a fourth boundary line 103, a fifth boundary line 104, a sixth boundary line 105, and a seventh boundary line 106.

The first boundary line 100 is a boundary line that defines the shape of the operating range, and is a line that represents the boundary of a turbine inlet temperature. When the operating point 300 passes through the first boundary line 100 and goes out of the operating range, there is a likelihood that the turbine inlet temperature may become an abnormal high temperature. The second boundary line 101 is a boundary line that defines the shape of the operating range, and is a line that represents the boundary of the engine stall. When the operating point 300 passes through the second boundary line 101 and goes out of the operating range, there is a likelihood that the gas turbine engine 11 may stop. The third boundary line 102 is a boundary line that defines the shape of the operating range, and is a line that represents the lower limit value of the number of revolutions (a first lower limit value of the number of revolutions) of the engine shaft. The fourth boundary line 103 is a boundary line that defines the shape of the operating range, and is a line that represents the lower limit value of the torque (a first lower limit value of the torque) of the engine shaft.

The fifth boundary line 104 is a boundary line that defines the shape of the operating range, and is a line that represents the boundary of misfire. When the operating point 300 passes through the fifth boundary line 104 and goes out of the operating range, there is a likelihood that the gas turbine engine 11 may misfire. The sixth boundary line 105 is a boundary line that defines the shape of the operating range, and is a line that represents an upper limit value of the number of revolutions (a first upper limit value of the number of revolutions). The seventh boundary line 106 is a boundary line that defines the shape of the operating range, and is a line that represents the maximum output limit (for example, 400 kW) of the gas turbine engine 11. The "first upper limit value of torque" shown in FIG. 3 represents the torque value at the point on which the first boundary line 100 and the seventh boundary line 106 intersect.

Each threshold value line for the number of revolutions of the engine shaft 12 is predetermined inside the operating range, for example, based on the experimental results. One closed region (range) surrounded by the first upper limit threshold value line 200, the first lower limit threshold value line 201, and the second lower limit threshold value line 202 forms a region (range) that is slightly narrower than the operating range inside the operating range.

The first upper limit threshold value line 200 is a line that represents a threshold value defined inside the boundary line defined by the third boundary line 102, the fourth boundary line 103, the fifth boundary line 104, the sixth boundary line 105, and the seventh boundary line 106 in the operating range. The first lower limit threshold value line 201 is a line that represents a threshold value defined inside the boundary line defined by the first boundary line 100 and the second boundary line 101 in the operating range. The second lower limit threshold value line 202 is a line that represents a threshold value defined between the boundary line defined by the first boundary line 100 and the second boundary line 101 and the first lower limit threshold value line 201 in the operating range.

Hereinafter, for the sake of simplicity, a case where the torque is constant and the operating point 300 moves, and a case where the number of revolutions is constant and the operating point 300 moves will be described.

Figure 4:
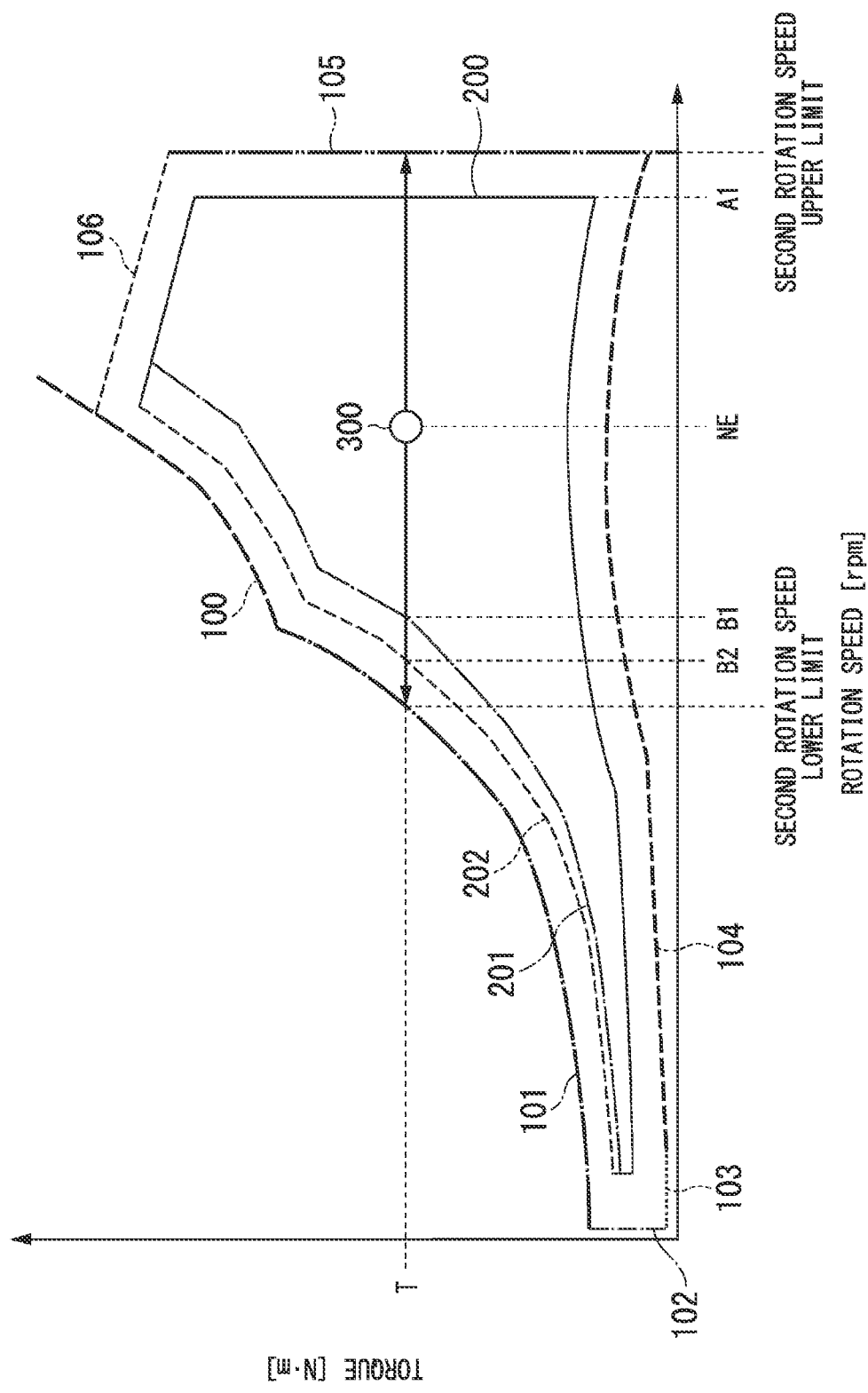
FIG. 4 is a diagram showing an example of each threshold value for the number of revolutions when the torque is constant.

FIG. 4 is a diagram showing an example of each threshold value for the number of revolutions when the torque is constant. A horizontal axis shows the number of revolutions of the engine shaft 12. A vertical axis shows the torque of the engine shaft 12. When the operating point 300 passes through the first upper limit threshold value line 200 within the operating range, there is a case where the number of revolutions of the engine shaft 12 may exceed the first upper limit threshold value "A1". When the operating point 300 passes through the first lower limit threshold value line 201 within the operating range, there is a case where the number of revolutions of the engine shaft 12 may be between the first lower limit threshold value "B1" and the second lower limit threshold value "B2". When the operating point 300 passes through the second lower limit threshold value line 202 within the operating range, there is a case where the number of revolutions of the engine shaft 12 may fall below the second lower limit threshold value "B2".

(When the Number of Revolutions "NE" of the Engine Shaft 12 Exceeds the First Upper Limit Threshold Value "A1")

The hybrid control unit 21 derives a rate of change "ΔNE/Δt" of the number of revolutions "NE" of the engine shaft 12. Here, "Δt" represents a predetermined time width (for example, 100 ms). "ΔNE" represents the amount of change in the number of revolutions "NE" in the predetermined time width "Δt".

The hybrid control unit 21 generates a control command for the engine control unit 19, thereby reducing the fuel flow rate of the gas turbine engine 11 depending on the rate of change in the number of revolutions of the engine shaft 12. For example, the hybrid control unit 21 reduces the fuel flow rate of the gas turbine engine 11 to be proportional to the rate of time change of the number of revolutions of the engine shaft 12.

Here, the hybrid control unit 21 may reduce the fuel flow rate of the gas turbine engine 11 to the lower limit flow rate. For example, the hybrid control unit 21 may reduce the fuel flow rate of the gas turbine engine 11 to zero, using a fuel shutoff valve. The hybrid control unit 21 generates a control command of the regenerative running for the generator control unit 22, thereby increasing the amount of power generation (amount of regeneration) of the generator 13 depending on the rate of change in the number of revolutions of the engine shaft 12. For example, the hybrid control unit 21 increases the amount of power generation (amount of regeneration) of the generator 13 to be proportional to the rate of time change of the number of revolutions of the engine shaft 12. Here, the hybrid control unit 21 may increase the amount of power generation of the generator 13 to the upper limit amount of power generation.

(When the Number of Revolutions "NE" of the Engine Shaft 12 is Between the First Lower Limit Threshold Value "B1" and the Second Lower Limit Threshold Value "B2")

The hybrid control unit 21 generates a control command for the engine control unit 19, thereby increasing the fuel flow rate of the gas turbine engine 11 depending on the rate of change in the number of revolutions of the engine shaft 12. For example, the hybrid control unit 21 increases the fuel flow rate of the gas turbine engine 11 to be proportional to the rate of time change of the number of revolutions of the engine shaft 12.

Here, the hybrid control unit 21 may increase the fuel flow rate of the gas turbine engine 11 to the upper limit flow rate. The hybrid control unit 21 generates a control command of the regenerative running for the generator control unit 22, thereby reducing the amount of power generation (amount of regeneration) of the generator 13 to the lower limit amount of power generation (e.g., 0 kW) depending on the rate of change in the number of revolutions of the engine shaft 12. For example, the hybrid control unit 21 reduces the amount of power generation of the generator 13 to the lower limit amount of power generation to be proportional to the rate of time change of the number of revolutions of the engine shaft 12.

(When the Number of Revolutions "NE" of the Engine Shaft 12 Falls Below the Second Lower Limit Threshold Value "B2")

The hybrid control unit 21 generates a control command for the engine control unit 19, thereby increasing the fuel flow rate of the gas turbine engine 11 to the upper limit flow rate depending on the rate of change in the number of revolutions of the engine shaft 12. For example, the hybrid control unit 21 increases the fuel flow rate of the gas turbine engine 11 to be proportional to the rate of time change of the number of revolutions of the engine shaft 12. The hybrid control unit 21 generates a control command of the power running for the generator control unit 22, thereby increasing the amount of power running (electric amount) of the generator 13 to the upper limit amount of power running, depending on the rate of change in the number of revolutions of the engine shaft 12. For example, the hybrid control unit 21 increases the amount of power running (electric amount) of the generator 13 to be proportional to the rate of time change of the number of revolutions of the engine shaft 12.

Next, the control based on the torque of the engine shaft 12 will be described.

Figure 5:
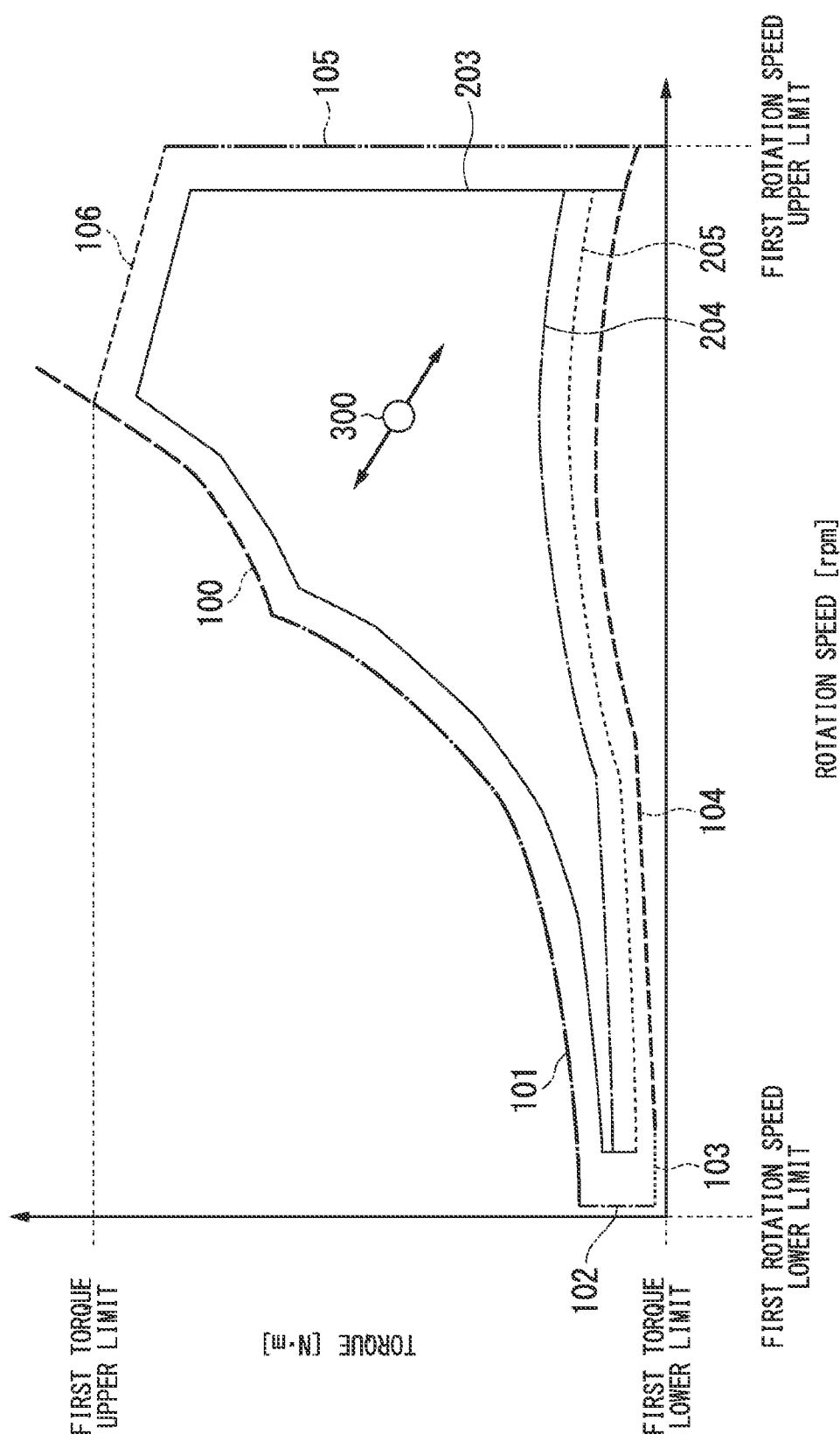
FIG. 5 is a diagram showing an example of each threshold value line for the torque.

FIG. 5 is a diagram showing an example of each threshold value line for torque. A horizontal axis shows the number of revolutions of the engine shaft 12. A vertical axis shows the torque of the engine shaft 12. Each threshold value line for the torque of the engine shaft 12 is defined inside the operating range in advance, for example, based on the experimental results. One closed region (range) surrounded by a second upper limit threshold value line 203, a third lower limit threshold value line 204, and a fourth lower limit threshold value line 205 is a region (range) that is slightly narrower than the operating range inside the operating range.

The second upper limit threshold value line 203 is a line that represents a threshold value defined inside a boundary line defined by the first boundary line 100, the second boundary line 101, the third boundary line 102, the sixth boundary line 105, and the seventh boundary line 106 in the operating range. The third lower limit threshold value line 204 is a line that represents a threshold value defined inside the boundary line defined by the fourth boundary line 103 and the fifth boundary line 104 in the operating range. The fourth lower limit threshold value line 205 is a line that represents a threshold value defined between the boundary line defined by the fourth boundary line 103 and the fifth boundary line 104 and the third lower limit threshold value line 204 in the operating range.

Figure 6:
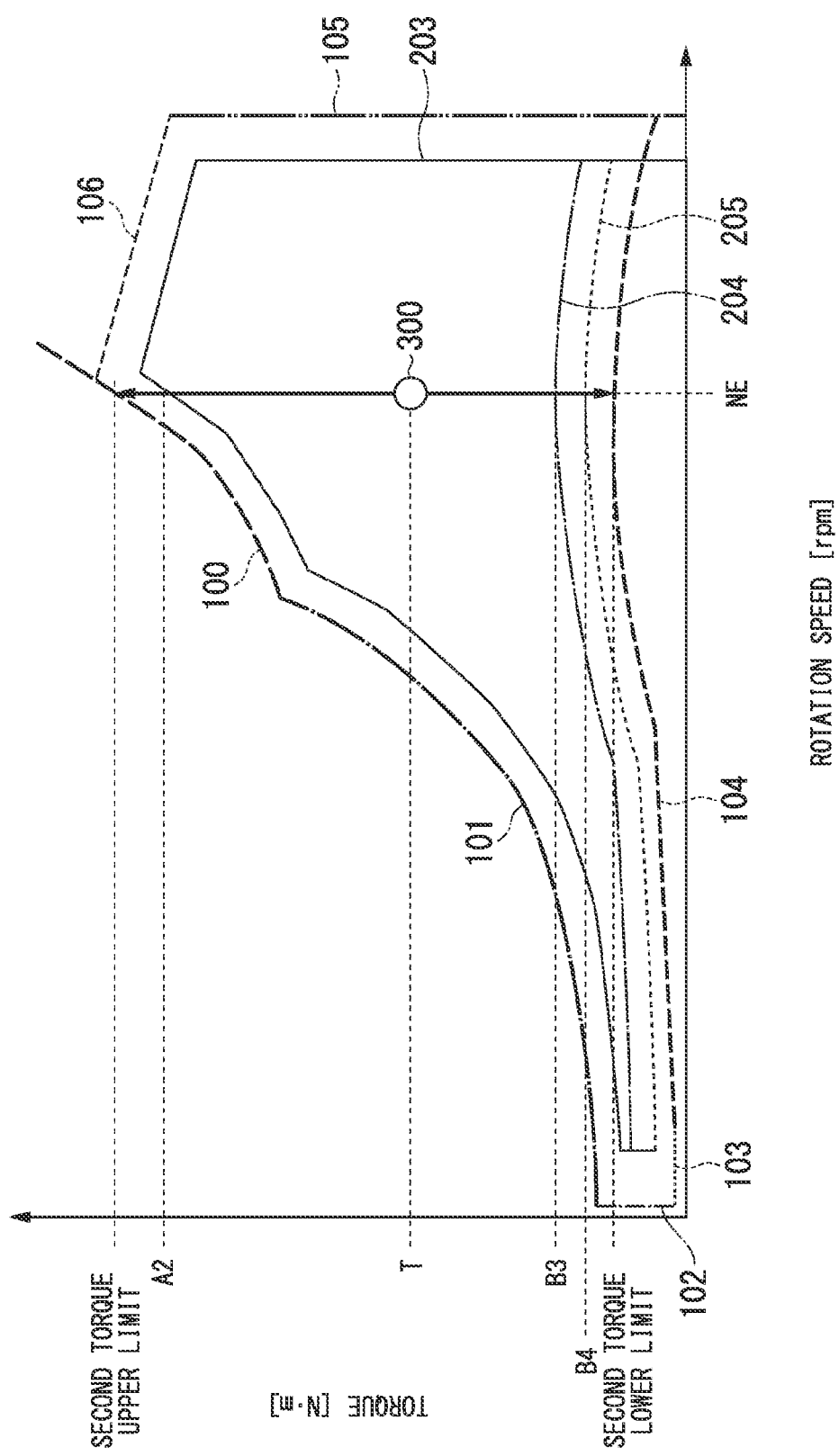
FIG. 6 is a diagram showing an example of each threshold value for the torque when the number of revolutions is constant.

FIG. 6 is a diagram showing an example of each threshold value for torque when the number of revolutions is constant. A horizontal axis shows the number of revolutions of the engine shaft 12. A vertical axis shows the torque of the engine shaft 12. When the operating point 300 passes through the second upper limit threshold value line 203 within the operating range, there is a case where the number of revolutions of the engine shaft 12 may exceed the second upper limit threshold value "A2". When the operating point 300 passes through the third lower limit threshold value line 204 within the operating range, there is a case where the number of revolutions of the engine shaft 12 may be between the third lower limit threshold value "B3" and the fourth lower limit threshold value "B4". When the operating point 300 passes through the fourth lower limit threshold value line 205 within the operating range, the number of revolutions of the engine shaft 12 may be lower than the fourth lower limit threshold value "B4".

(When the Torque "T" of the Engine Shaft 12 Exceeds the Second Upper Limit Threshold Value "A2")

The hybrid control unit 21 derives the rate of change "ΔT/Δt" of the torque "T" of the engine shaft 12. Here, "Δt" represents a predetermined time width (for example, 100 ms). "ΔT" represents the amount of change in torque "T" within the predetermined time width "Δt".

The hybrid control unit 21 generates a control command for the engine control unit 19, thereby reducing the fuel flow rate of the gas turbine engine 11 depending on the rate of change in the torque of the engine shaft 12. For example, the hybrid control unit 21 reduces the fuel flow rate of the gas turbine engine 11 to be proportional to the rate of time change of the torque of the engine shaft 12.

Here, the hybrid control unit 21 may reduce the fuel flow rate of the gas turbine engine 11 to the lower limit flow rate. For example, the hybrid control unit 21 may reduce the fuel flow rate of the gas turbine engine 11 to zero, using the fuel shutoff valve. The hybrid control unit 21 generates a control command of the regenerative running to the generator control unit 22, thereby increasing the amount of power generation (amount of regeneration) of the generator 13 depending on the rate of change in the torque of the engine shaft 12. For example, the hybrid control unit 21 increases the amount of power generation (amount of regeneration) of the generator 13 to be proportional to the rate of time change of the torque of the engine shaft 12. Here, the hybrid control unit 21 may increase the amount of power generation of the generator 13 to the upper limit amount of power generation.

(When the Torque "T" of the Engine Shaft 12 is Between the Third Lower Limit Threshold Value "B3" and the Fourth Lower Limit Threshold Value "B4")

The hybrid control unit 21 generates a control command for the engine control unit 19 to increase the fuel flow rate of the gas turbine engine 11 depending on the rate of change in the torque of the engine shaft 12. For example, the hybrid control unit 21 increases the fuel flow rate of the gas turbine engine 11 to be proportional to the rate of time change of the torque of the engine shaft 12.

Here, the hybrid control unit 21 may increase the fuel flow rate of the gas turbine engine 11 to the upper limit flow rate. The hybrid control unit 21 generates a control command of the regenerative running to the generator control unit 22, thereby reducing the amount of power generation (amount of regeneration) of the generator 13 to the lower limit amount of power generation (e.g., 0 kW), depending on the rate of change in the torque of the engine shaft 12. For example, the hybrid control unit 21 reduces the amount of power generation of the generator 13 to the lower limit amount of power generation to be proportional to the rate of time change of the torque of the engine shaft 12.

(When the Torque "T" of the Engine Shaft 12 Falls Below the Fourth Lower Limit Threshold Value "B4")

The hybrid control unit 21 generates a control command for the engine control unit 19, thereby increasing the fuel flow rate of the gas turbine engine 11 to the upper limit flow rate depending on the rate of change in the torque of the engine shaft 12. For example, the hybrid control unit 21 increases the fuel flow rate of the gas turbine engine 11 to be proportional to the rate of time change of the torque of the engine shaft 12. The hybrid control unit 21 generates a control command of the power running to the generator control unit 22, thereby increasing the amount of power running (electric amount) of the generator 13 to the upper limit amount of power running, depending on the rate of change in the torque of the engine shaft 12. For example, the hybrid control unit 21 increases the amount of power running (electric amount) of the generator 13 to be proportional to the rate of time change of the torque of the engine shaft 12.

Next, an operating example of the aircraft propulsion system 2 will be described.

[Operating Example Based on Each Threshold Value of Number of Revolutions]

Figure 7:
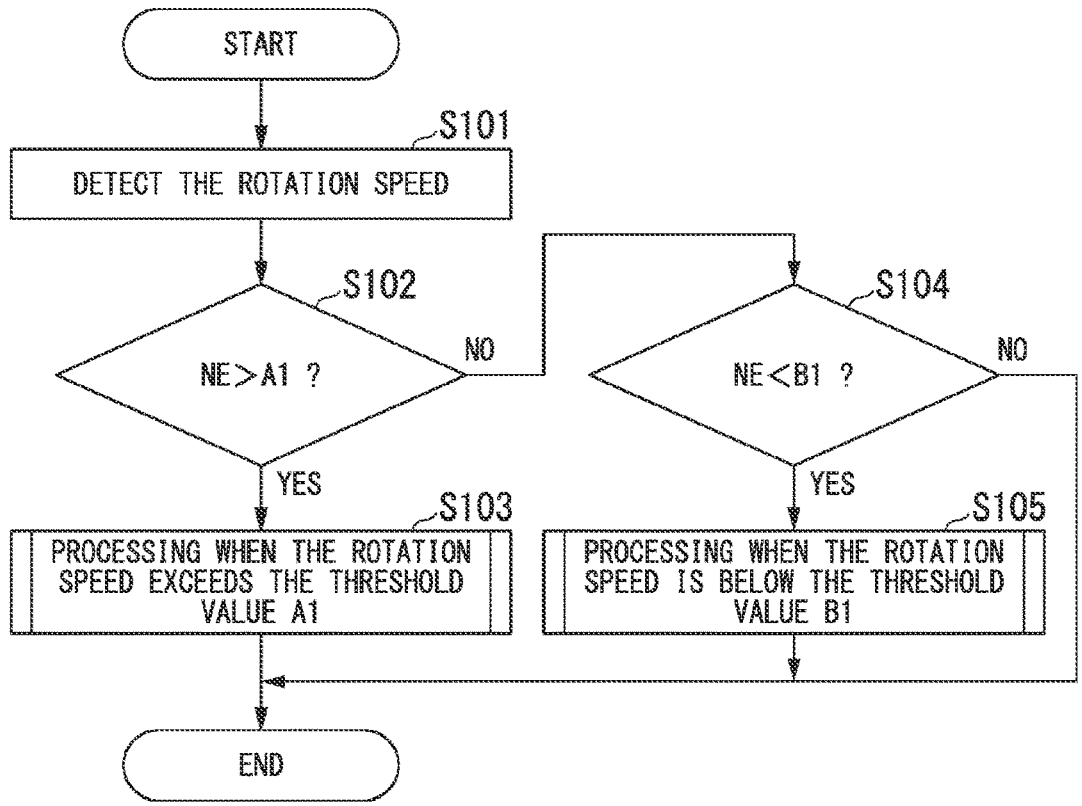
FIG. 7 is a flowchart showing an operating example based on each threshold value of number of revolutions.

FIG. 7 is a flowchart showing an operating example based on each threshold value of number of revolutions. The aircraft propulsion system 2 executes the process shown in FIG. 7 at a predetermined cycle (e.g., a 100 ms cycle). The detection unit 18 detects the number of revolutions of the engine shaft 12. The detection unit 18 transmits the data of number of revolutions of the engine shaft 12 to the engine control unit 19. The engine control unit 19 transmits the data of number of revolutions of the engine shaft 12 to the hybrid control unit 21 (step S101).

Next, the hybrid control unit 21 determines whether the number of revolutions "NE" of the engine shaft 12 exceeds the first upper limit threshold value "A1" (step S102). When the number of revolutions of the engine shaft 12 exceeds the first upper limit threshold value, the hybrid control unit 21 executes a process in a case in which the number of revolutions exceeds the first upper limit threshold value "A1" (step S103).

When the number of revolutions of the engine shaft 12 does not exceed the first upper limit threshold value, the hybrid control unit 21 determines whether the number of revolutions of the engine shaft 12 falls below the first lower limit threshold value "B 1" (step S104). When the number of revolutions of the engine shaft 12 falls below the first lower limit threshold value, the hybrid control unit 21 executes a process in a case in which the number of revolutions of the engine shaft 12 falls below the first lower limit threshold value "B 1" (step S105). When the number of revolutions of the engine shaft 12 does not fall below the first lower limit threshold value, the hybrid control unit 21 ends the process shown in FIG. 7.

Figure 8:
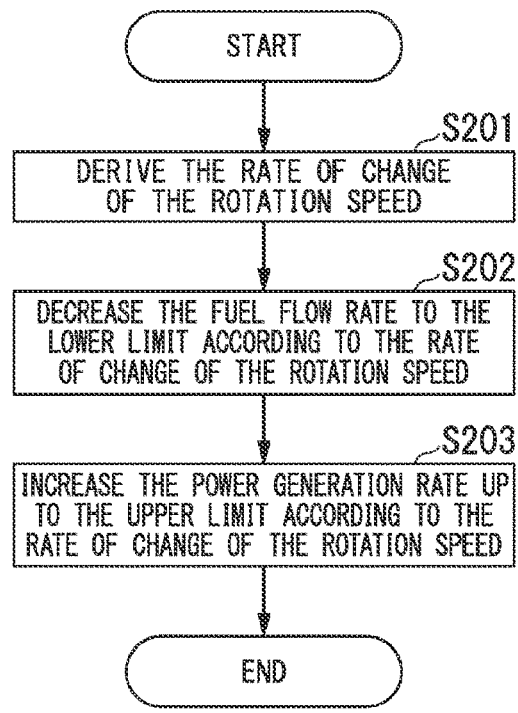
FIG. 8 is a flowchart showing a processing example when the number of revolutions exceeds a first upper limit threshold value.

FIG. 8 is a flowchart showing a processing example when the number of revolutions exceeds the first upper limit threshold value "A1". The hybrid control unit 21 derives the rate of change "ΔNE/Δt" of the number of revolutions "NE" of the engine shaft 12 (step S201).

Next, the hybrid control unit 21 generates a control command for the engine control unit 19, thereby reducing the fuel flow rate of the gas turbine engine 11 depending on the rate of change in the number of revolutions of the engine shaft 12. Here, the hybrid control unit 21 may reduce the fuel flow rate of the gas turbine engine 11 to the lower limit flow rate (step S202).

Next, the hybrid control unit 21 generates a control command of the regenerative running to the generator control unit 22, thereby increasing the amount of power generation (amount of regeneration) of the generator 13 depending on the rate of change in the number of revolutions of the engine shaft 12. Here, the hybrid control unit 21 may increase the amount of power generation of the generator 13 to the upper limit amount of power generation (step S203).

Figure 9:
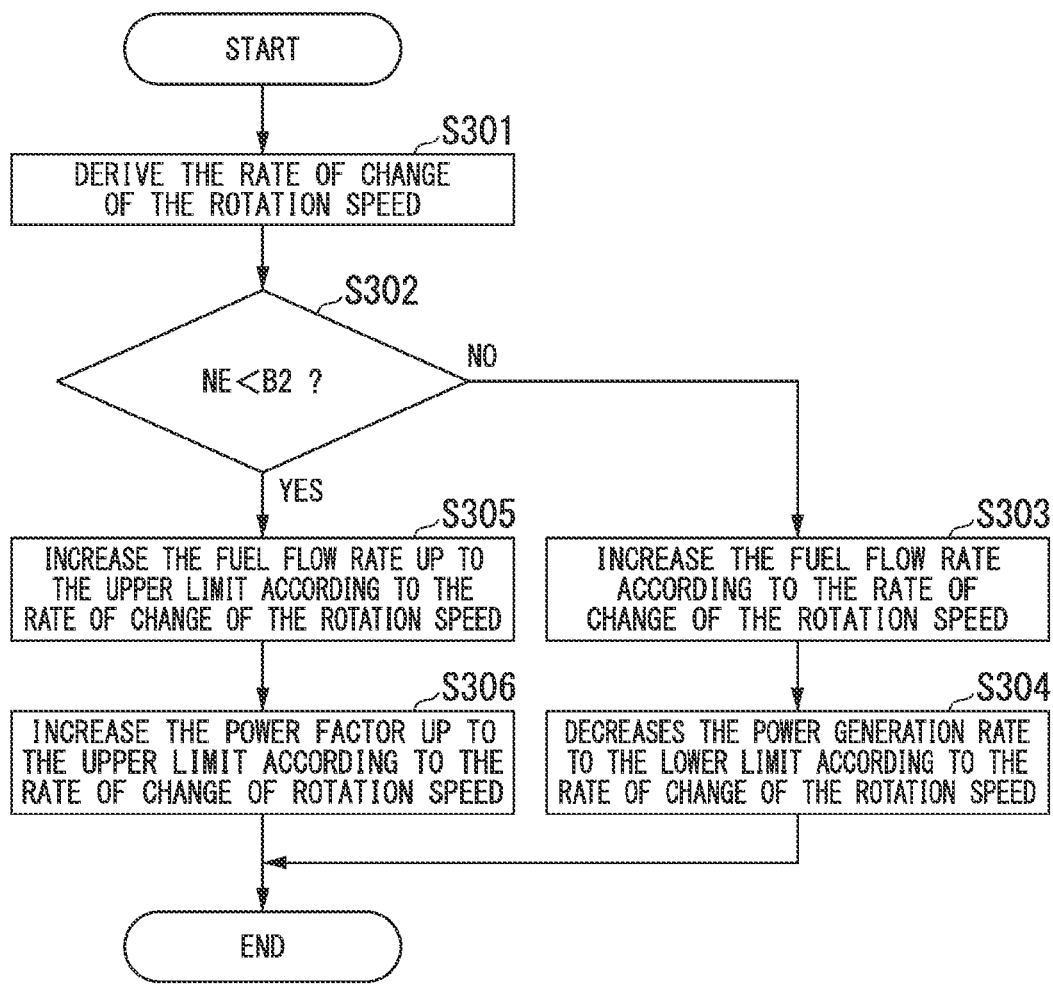
FIG. 9 is a flowchart showing a processing example when the number of revolutions is below a first lower limit threshold value.

FIG. 9 is a flowchart showing a processing example when the number of revolutions falls below the first lower limit threshold value "B1". The hybrid control unit 21 derives the rate of change "ΔNE/Δt" of the number of revolutions "NE" of the engine shaft 12 (step S301). Next, the hybrid control unit 21 determines whether the number of revolutions of the engine shaft 12 falls below the second lower limit threshold value "B2" (step S302).

When the number of revolutions of the engine shaft 12 does not fall below the second lower limit threshold value (when the number of revolutions of the engine shaft 12 is between the first lower limit threshold value "B1" and the second lower limit threshold value "B2"), the hybrid control unit 21 generates a control command for the engine control unit 19, thereby increasing the fuel flow rate of the gas turbine engine 11 depending on the rate of change in the number of revolutions of the engine shaft 12. Here, the hybrid control unit 21 may increase the fuel flow rate of the gas turbine engine 11 to the upper limit flow rate (step S303). Next, the hybrid control unit 21 generates a control command of the regenerative running to the generator control unit 22, thereby reducing the amount of power generation (amount of regeneration) of the generator 13 to the lower limit amount of power generation (for example, 0 kW), depending on the rate of change in the number of revolutions of the engine shaft 12 (step S304).

When the number of revolutions of the engine shaft 12 falls below the second lower limit threshold value "B2", the hybrid control unit 21 generates a control command for the engine control unit 19, thereby increasing the fuel flow rate of the gas turbine engine 11 to the upper limit flow rate, depending on the rate of change in the number of revolutions of the engine shaft 12 (step S305). Next, the hybrid control unit 21 generates a control command of the power running to the generator control unit 22, thereby increasing the amount of power running (electric amount) of the generator 13 to the upper limit amount of power running, depending on the rate of change in the number of revolutions of the engine shaft 12 (step S306).

[Operating Example Based on Each Torque Threshold Value]

Figure 10:
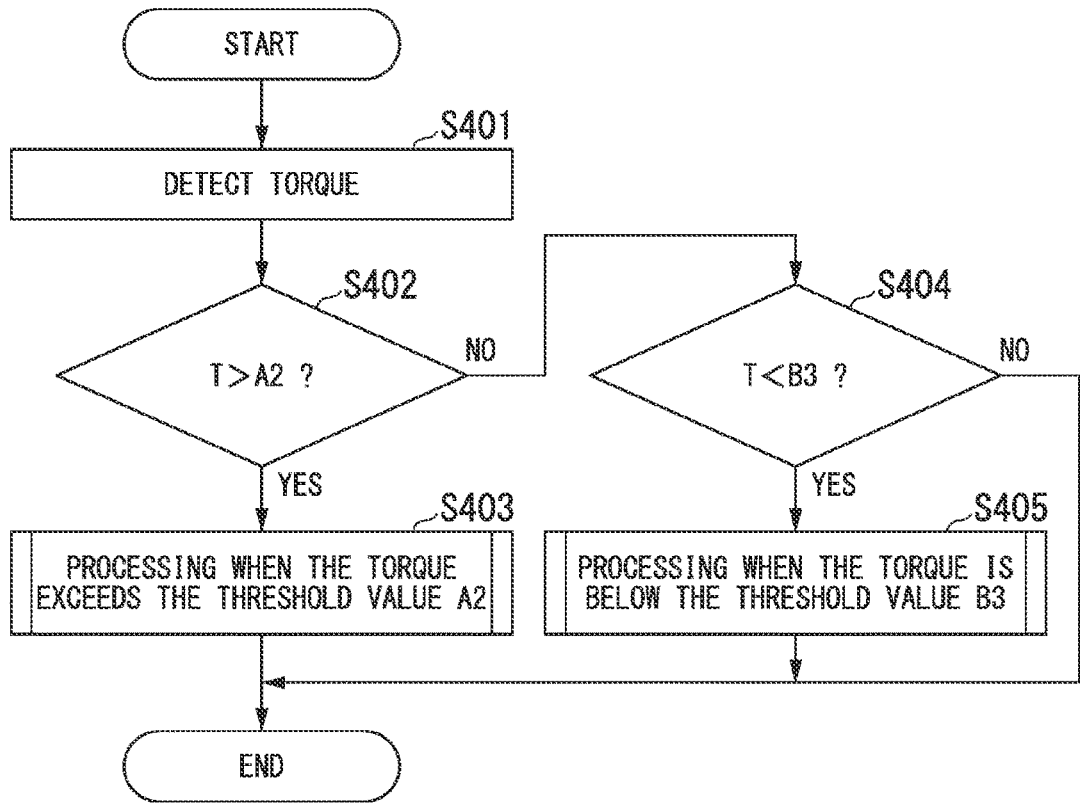
FIG. 10 is a flowchart showing an operating example based on each torque threshold value.

FIG. 10 is a flowchart showing an operating example based on each torque threshold value. The aircraft propulsion system 2 executes the process shown in FIG. 10 at a predetermined cycle (for example, 100 ms cycle). The detection unit 18 detects the torque of the engine shaft 12. The detection unit 18 transmits the torque data of the engine shaft 12 to the engine control unit 19. The engine control unit 19 transmits the torque data of the engine shaft 12 to the hybrid control unit 21 (step S401).

Next, the hybrid control unit 21 determines whether the torque "T" of the engine shaft 12 exceeds the second upper limit threshold value "A2" (step S402). Next, when the torque of the engine shaft 12 exceeds the second upper limit threshold value, the hybrid control unit 21 executes the process in a case in which torque exceeds the second upper limit threshold value "A2" (step S403).

When the torque of the engine shaft 12 does not exceed the second upper limit threshold value, the hybrid control unit 21 determines whether the torque of the engine shaft 12 falls below the third lower limit threshold value "B3" (step S404). When the torque of the engine shaft 12 falls below the third lower limit threshold value, the hybrid control unit 21 executes the process in a case in which torque of the engine shaft 12 falls below the third lower limit threshold value "B3" (step S405). When the torque of the engine shaft 12 does not fall below the third lower limit threshold value, the hybrid control unit 21 ends the process shown in FIG. 10.

Figure 11:
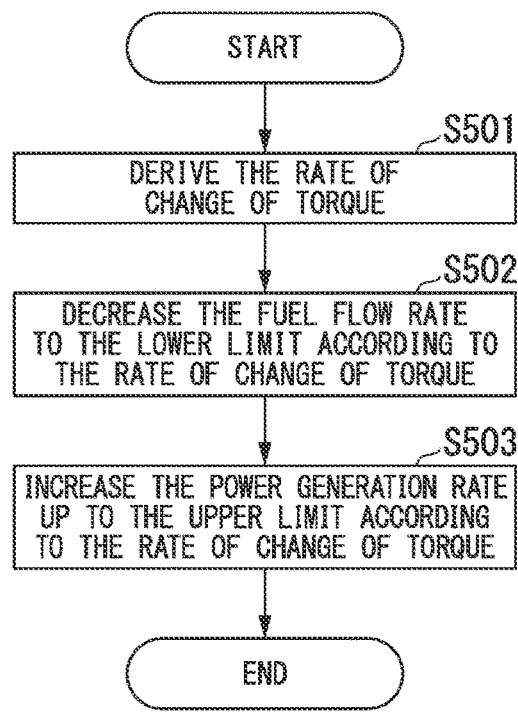
FIG. 11 is a flowchart showing a processing example in a case in which the torque exceeds a second upper limit threshold value.

FIG. 11 is a flowchart showing a processing example in a case in which the torque exceeds the second upper limit threshold value "A2". The hybrid control unit 21 derives the rate of change "$\Delta T/\Delta t$" of the torque "T" of the engine shaft 12 (step S501).

Next, the hybrid control unit 21 generates a control command for the engine control unit 19, thereby reducing the fuel flow rate of the gas turbine engine 11 depending on the rate of change in the torque of the engine shaft 12. Here, the hybrid control unit 21 may reduce the fuel flow rate of the gas turbine engine 11 to the lower limit flow rate (step S502).

Next, the hybrid control unit 21 generates a control command of the regenerative running to the generator control unit 22, thereby reducing the amount of power generation (amount of regeneration) of the generator 13 depending on the rate of change in the torque of the engine shaft 12. Here, the hybrid control unit 21 may increase the amount of power generation of the generator 13 to the upper limit amount of power generation (step S503).

Figure 12:
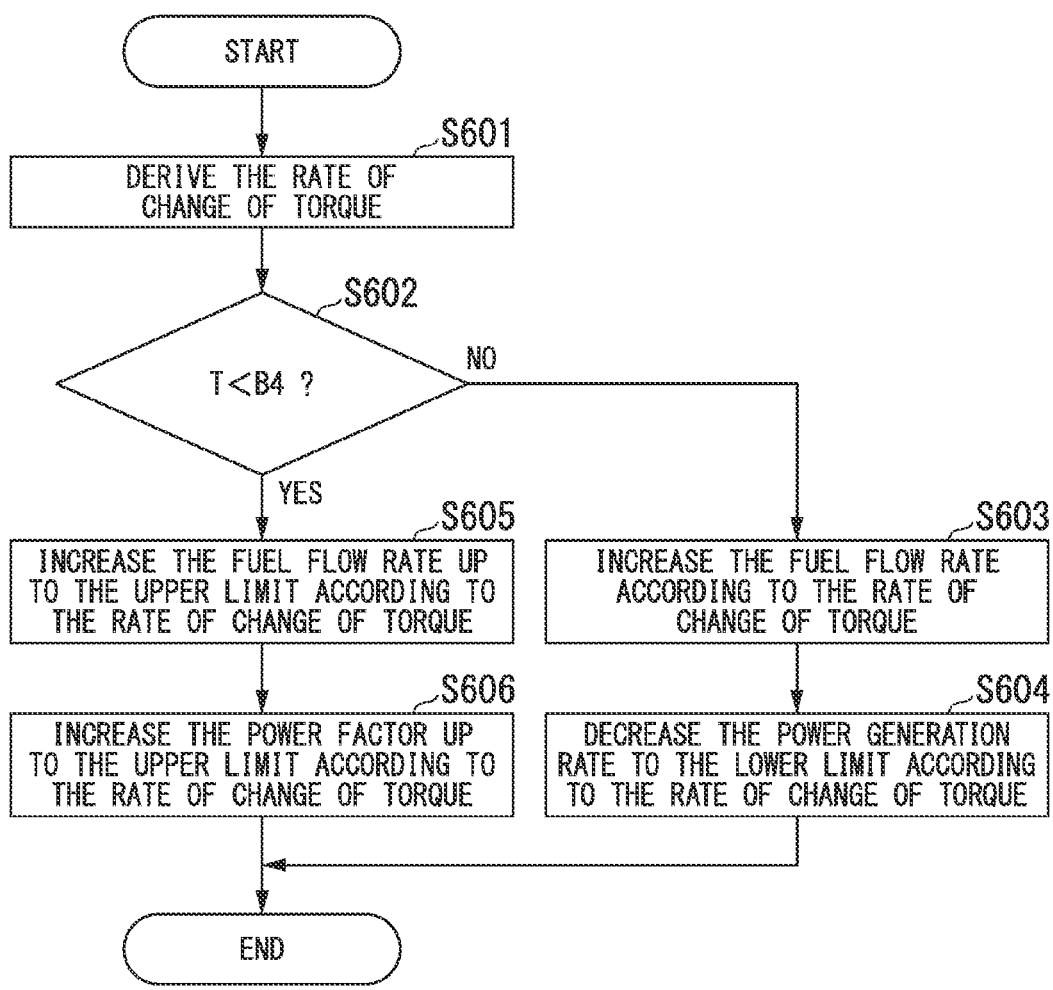
FIG. 12 is a flowchart showing a processing example in a case in which the torque is below a third lower limit threshold value.

FIG. 12 is a flowchart showing a processing example in a case in which the torque falls below the third lower limit threshold value "B3". The hybrid control unit 21 derives the rate of change "$\Delta T/\Delta t$" of the torque "T" of the engine shaft 12 (step S601). Next, the hybrid control unit 21 determines whether the torque of the engine shaft 12 falls below the fourth lower limit threshold value "B4" (step S602).

When the torque of the engine shaft 12 does not fall below the fourth lower limit threshold value (when the torque of the engine shaft 12 is between the third lower limit threshold value "B3" and the fourth lower limit threshold value "B4"), the hybrid control unit 21 generates a control command for the engine control unit 19, thereby increasing the fuel flow rate of the gas turbine engine 11 depending on the rate of change in the torque of the engine shaft 12. Here, the hybrid control unit 21 may increase the fuel flow rate of the gas turbine engine 11 to the upper limit flow rate (step S603). Next, the hybrid control unit 21 generates a control command of the regenerative running to the generator control unit 22, thereby reducing the amount of power generation (amount of regeneration) of the generator 13 to the lower limit amount of power generation (for example, 0 kW) depending on the rate of change in the torque of the engine shaft 12 (step S604).

When the torque of the engine shaft 12 falls below the third lower limit threshold value "B3", the hybrid control unit 21 generates a control command for the engine control unit 19, thereby increasing the fuel flow rate of the gas turbine engine 11 to the upper limit flow rate, depending on the rate of change of the torque of the engine shaft 12 (step S605). Next, the hybrid control unit 21 generates a control command of the power running to the generator control unit 22, thereby increasing the amount of power running (electric amount) of the generator 13 the upper limit amount of power running, depending on the rate of change in the torque of the engine shaft 12 (step S606).

In this way, the generator 13 generates electricity by utilizing the rotation of the engine shaft 12 of the gas turbine engine 11 mounted on the aircraft 1. The generator 13 may execute the power running by utilizing the electric power that is output from the storage battery 15. The storage battery 15 stores the electric power generated by the generator 13. The storage battery 15 may discharge the stored electric power. The motor 20 drives the rotor 30-$n$ by utilizing at least one of the electric power that is output from the generator 13 and the electric power that is output from the storage battery 15. The detection unit 18 detects the number of revolutions of the engine shaft 12. The engine control unit 19 controls at least the fuel flow rate of the gas turbine engine 11. At least, when the number of revolutions of the engine shaft 12 satisfies a predetermined condition, the generator control unit 22 executes a control for reducing a sudden change in the number of revolutions. This makes it possible to protect the gas turbine engine against a sudden load loss or an overload on the engine shaft.

The detection unit 18 may detect the torque of the engine shaft 12. At least the generator control unit 22 may execute a control for reducing a sudden change in torque when the torque of the engine shaft 12 satisfies a predetermined condition. The generator control unit 22 may execute a control for reducing a sudden change in torque when the torque of the engine shaft 12 satisfies a predetermined condition. This makes it possible to protect the gas turbine engine against a sudden load loss or an overload on the engine shaft.

The embodiment described above can be expressed as follows.

An aircraft propulsion system which includes
a storage device which stores a program; and
a hardware processor
in which when the hardware processor executes the program stored in the storage device,
electricity is generated using rotation of an engine shaft,
an electric power generated by the generator is stored,
a rotor is driven, using at least one of the electric power which is output from the generator and the electric power which is output from the storage battery,
the number of revolutions of the engine shaft is detected,
at least a fuel flow rate of the gas turbine engine is controlled,
the operation of the generator is controlled, and
at least the generator control unit is configured to execute a control for reducing a sudden change in the number of revolutions when the number of revolutions satisfies a predetermined condition.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

APPENDIX 1

The aircraft propulsion system in which the predetermined condition (second predetermined condition) is that regarding a first threshold value (third threshold value) and a second threshold value (fourth threshold value) determined depending on an operating point determined based on the number of revolutions and a torque of the engine shaft, one of a first condition (third condition), in which the number of revolutions exceeds the first threshold value, and a second condition (fourth condition), in which the number of revolutions falls below the second threshold value smaller than the first threshold value, is satisfied, when the first condition (third condition) is satisfied, the generator control unit increases an amount of power generation of the generator as compared with the amount of power generation of the generator before the first condition (third condition) is satisfied, and when the second condition (fourth condition) is satisfied, the generator control unit reduces the amount of power generation of the generator as compared with the amount of power generation of the generator before the second condition (fourth condition) is satisfied.

According to the aspect of Appendix 1, when the torque satisfies a predetermined condition, at least the generator control unit executes the control for reducing the sudden change in the torque. Accordingly, the aircraft propulsion system can protect the gas turbine engine against a sudden load loss or an overload on the engine shaft.

APPENDIX 2

In the aircraft propulsion system described in Appendix 1, when the first condition (third condition) is satisfied, the engine control unit reduces the fuel flow rate depending on a rate of change in the torque.

According to the aspect of Appendix 2, the aircraft propulsion system can reduce the likelihood that the torque of the engine shaft exceeds the upper limit value of the torque due to the load loss.

APPENDIX 3

In the aircraft propulsion system described in Appendix 2, when the first condition (third condition) is satisfied, the generator control unit increases the amount of power generation of the generator to an upper limit value of the amount of power generation, and the engine control unit reduces the fuel flow rate to a lower limit value of the flow rate.

According to the aspect of Appendix 3, the aircraft propulsion system can reduce the likelihood that the torque of the engine shaft exceeds the upper limit value of the torque due to the load loss.

APPENDIX 4

In the aircraft propulsion system described in Appendix 1, when the second condition (fourth condition) is satisfied, the engine control unit increases the fuel flow rate depending on the rate of change in the torque.

According to the aspect of Appendix 4, the aircraft propulsion system can reduce the likelihood that the torque of the engine shaft falls below the lower limit value of the torque due to the overload.

APPENDIX 5

In the aircraft propulsion system described in Appendix 4, when the second condition (fourth condition) is satisfied, the generator control unit increases an amount of power running of the generator, and the engine control unit increases the fuel flow rate to an upper limit value of the flow rate.

According to the aspect of Appendix 5, the aircraft propulsion system can further reduce the likelihood that the torque of the engine shaft falls below the lower limit value of the torque due to the overload.

APPENDIX 6

In the aircraft propulsion system described in Appendix 1, when the second condition (fourth condition) is satisfied and the torque does not reach a target value within a predetermined time, the generator control unit increases an amount of power running of the generator.

According to the aspect of Appendix 6, the aircraft propulsion system can further reduce the likelihood that the torque of the engine shaft falls below the lower limit value of torque due to the overload.

EXPLANATION OF REFERENCES

1 Aircraft
2 Aircraft propulsion system
10 Airframe
11 Gas turbine engine
12 Engine shaft
13 Generator
14 Converter
15 Storage battery
16 Inverter
17 Storage battery control unit
18 Detection unit
19 Engine control unit
20 Motor
22 Generator control unit
23 Operation unit
24 Flight control unit
25 Motor control unit
30 Rotor
40 Arm
100 First boundary line
101 Second boundary line
102 Third boundary line
103 Fourth boundary line
104 Fifth boundary line
105 Sixth boundary line
106 Seventh boundary line
200 First upper limit threshold value line
201 First lower limit threshold value line
202 Second lower limit threshold value line
203 Second upper limit threshold value line
204 Third lower limit threshold value line
205 Fourth lower limit threshold value line
300 Operating point

What is claimed is:

1. An aircraft propulsion system comprising:
a gas turbine engine mounted on an aircraft;
a generator which is coupled to an engine shaft of the gas turbine engine and generates electricity using rotation of the engine shaft;
a storage battery which stores an electric power generated by the generator;
a motor which drives a rotor, using at least one of the electric power which is output from the generator or the electric power which is output from the storage battery;
a detection unit which detects the revolutions per minute (rpm) of the engine shaft;
an engine controller which controls at least a fuel flow rate of the gas turbine engine; and a generator controller which controls the operation of the generator, wherein when the rpm satisfies a predetermined condition, at least the generator controller executes a control to suppress a change in rpm from an initial rpm;

wherein the predetermined condition is that regarding a first threshold value and a second threshold value determined depending on an operating point determined based on the rpm and a torque of the engine shaft, and one of:

a first condition, in which the rpm exceeds the first threshold value; or a second condition, in which the rpm falls below the second threshold value smaller than the first threshold value, is satisfied;

wherein, when the first condition is satisfied:

the generator controller increases an amount of power generation of the generator as compared with the amount of power generation of the generator before the first condition is satisfied; and the engine controller reduces the fuel flow rate depending on a rate of change in the rpm of the engine shaft; and wherein when the second condition is satisfied:

the generator controller reduces the amount of power generation of the generator as compared with the amount of power generation of the generator before the second condition is satisfied.

2. The aircraft propulsion system according to claim 1, wherein when the first condition is satisfied, the generator controller increases the amount of power generation of the generator to an upper limit value of the amount of power generation, and the engine controller reduces the fuel flow rate to a lower limit value of the flow rate.

3. The aircraft propulsion system according to claim 1, wherein when the second condition is satisfied, the engine controller increases the fuel flow rate depending on the rate of change in the rpm.

4. The aircraft propulsion system according to claim 1, wherein when the second condition is satisfied, the generator controller increases an amount of power running of the generator, and the engine controller increases the fuel flow rate to an upper limit value of the flow rate.

5. The aircraft propulsion system according to claim 1, wherein when the second condition is satisfied and the rpm does not reach a target value within a predetermined time, the generator controller increases an amount of power running of the generator.

6. The aircraft propulsion system according to claim 1, wherein regarding a third threshold value and a fourth threshold value defined according to the operating point, when one of a third condition, in which the torque exceeds the third threshold value, and a fourth condition, in which the torque falls below the fourth threshold value smaller than the third threshold value, is satisfied, the generator controller executes a control to suppress a change in the torque from an initial torque.

7. An aircraft propulsion system comprising:

a gas turbine engine mounted on an aircraft;

a generator which is coupled to an engine shaft of the gas turbine engine and generates electricity using rotation of the engine shaft;

a storage battery which stores an electric power generated by the generator;

a motor which drives a rotor, using at least one of the electric power which is output from the generator or the electric power which is output from the storage battery;

a detection unit which detects a torque of the engine shaft;

an engine controller which controls at least a fuel flow rate of the gas turbine engine; and a generator controller which controls the operation of the generator, wherein when the rate of change in the torque satisfies a predetermined condition, at least the generator controller executes a control to suppress a change in the torque from an initial torque, wherein the predetermined condition is that regarding a first threshold value and a second threshold value determined depending on an operating point determined based on a rpm and the torque of the engine shaft, and one of:

a first condition, in which the torque exceeds the first threshold value; or a second condition, in which the torque falls below the second threshold value smaller than the first threshold value, is satisfied;

wherein, when the first condition is satisfied:

the generator controller increases an amount of power generation of the generator as compared with the amount of power generation of the generator before the first condition is satisfied; and the engine controller reduces the fuel flow rate depending on a rate of change in the torque of the engine shaft; and wherein when the second condition is satisfied:

the generator controller reduces the amount of power generation of the generator as compared with the amount of power generation of the generator before the second condition is satisfied.

* * * * *